May 22, 1923.

R. P. PESCARA

DIFFERENTIAL DRIVE FOR HELICOPTERS

Filed Feb. 28, 1921

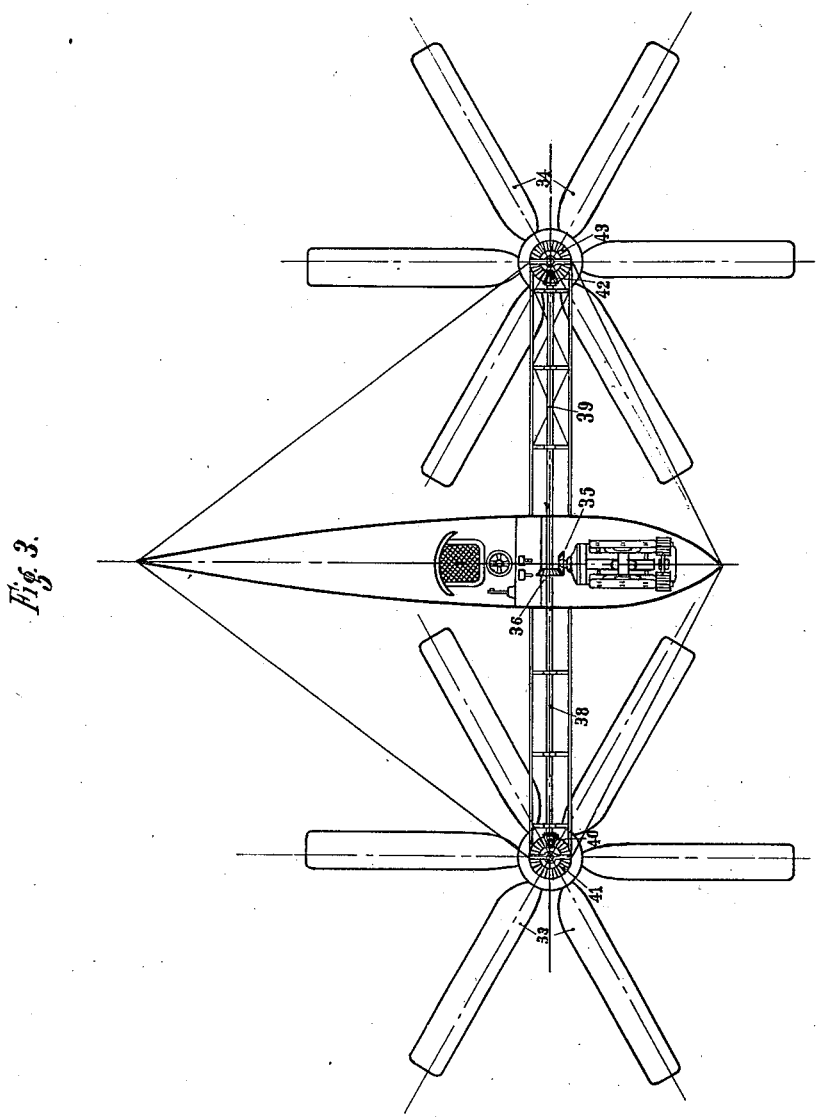

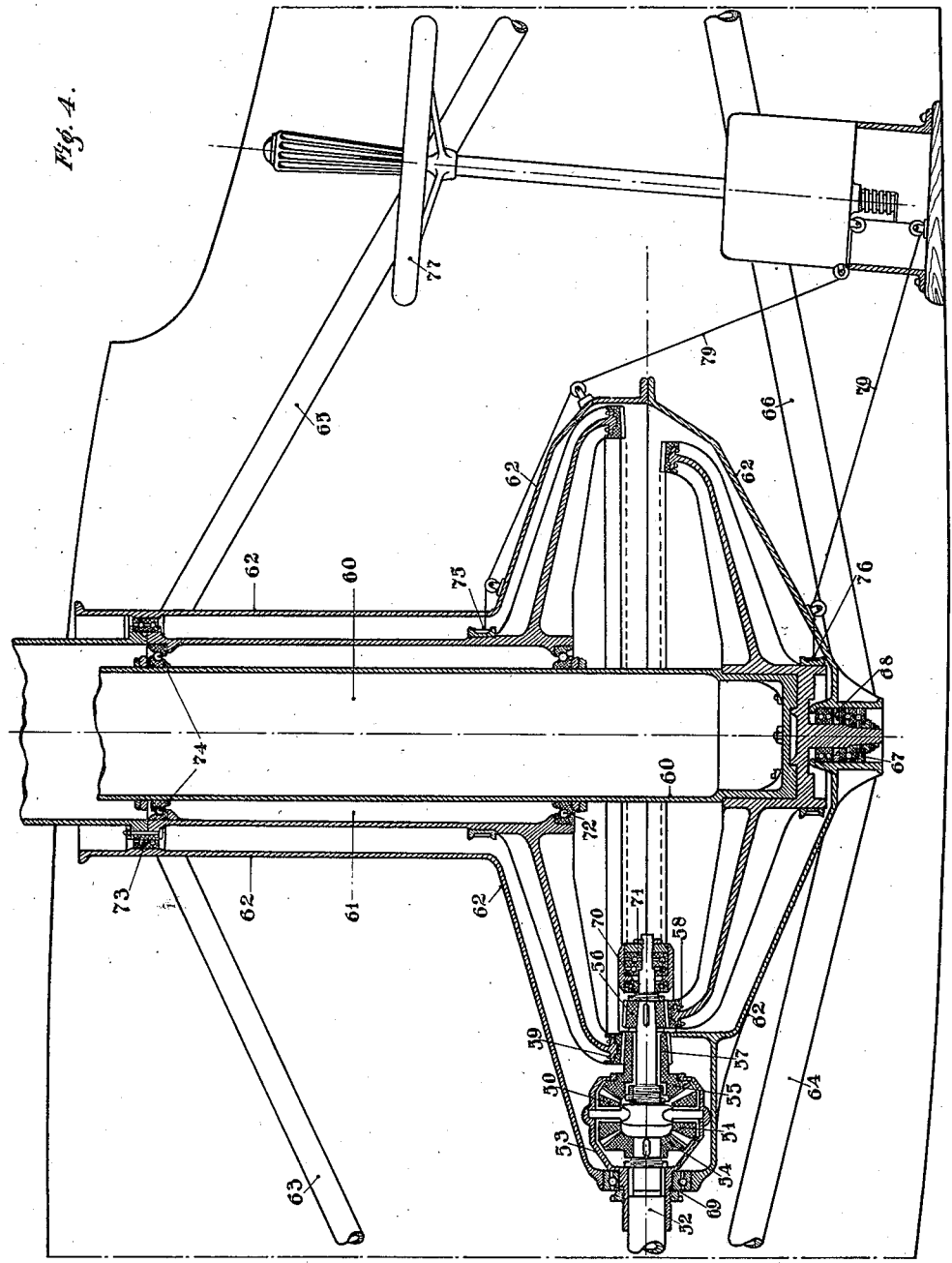

Patented May 22, 1923.

1,456,399

UNITED STATES PATENT OFFICE.

RAUL PATERAS PESCARA, OF BARCELONA, SPAIN.

DIFFERENTIAL DRIVE FOR HELICOPTERS.

Application filed February 28, 1921. Serial No. 448,644.

*To all whom it may concern:*

Be it known that RAUL PATERAS PESCARA, citizen of Argentina, residing at Barcelona, Spain, Calle Buenasuerte 20 (S. M.), has invented certain new and useful Improvements in Differential Drives for Helicopters (for which I have filed application in Spain February 21, 1920), of which the following is a specification, reference being had therein to the accompanying drawing.

This invention is directed to an improvement in flying machines of the helicopter type, and is directed to a construction designed to overcome the disadvantage incident to the reverse operation of the two propellers.

It is well understood that the resistance to the movements of the propellers has to be provided for, and where these propellers are necessarily relatively different in their resistance to rotation, the necessary tendency to movement of rotation in the frame work of the flying machine must be overcome. That this relative difference between propellers of this type must exist in practical use is evident from the fact that it is impossible to construct two propellers of exact similar detail and to have these propellers work under identical conditions.

It has been heretofore proposed to overcome this rotative influence on the frame work or body of the aeroplane by vertical rudders, but such are completely ineffective in direct ascension or descension of the flying machine.

The present invention is directed particularly to a mechanical means for overcoming this variation in propeller effect, such means consisting essentially in coupling the propellers through a differential and to utilize a driving means between the motor and propellers as will provide a system of transmission which will compensate for the differences between the resistances to rotation of the propellers.

The invention is illustrated in the following drawings, in which:

Fig. 3 is a view illustrating the invention as applied to flying machines of the helicopter type with the propellers in the same horizontal plane.

Fig. 4 is an enlarged sectional view illustrating the application of the invention as a double differential between the motor and propellers.

Figure 1:
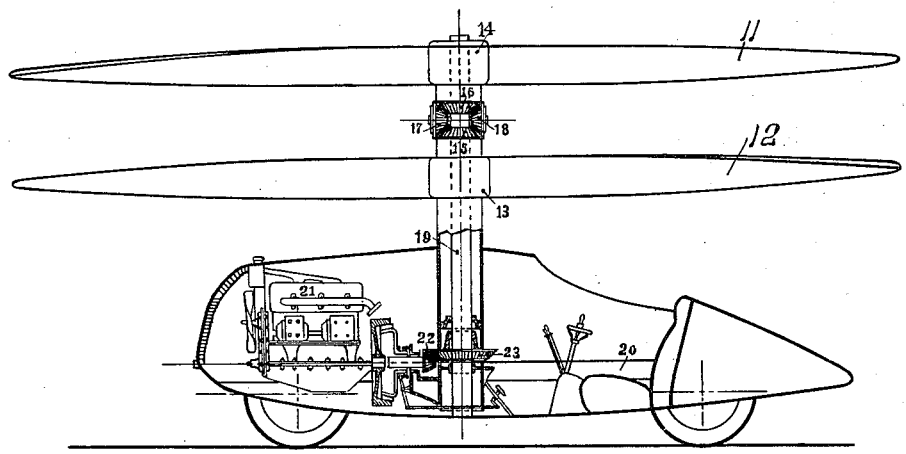
Fig. 1 is a view in elevation, partly in section, illustrating one form of the invention.

In Fig. 1, there is shown a differential, constituting an epicyclic gear construction, composed of the crown wheels 15 and 16, fixed to the hubs 13 and 14 of the propellers 12 and 11. These crown wheels are aligned and satellites 17 and 18 are connected with both crown wheels, with the axis of rotation of the satellites fixed to the general frame work of the apparatus. A central tube 19 serves as the axis of the propellers. A motor 21 drives through the hub of the lower propeller as 12 by means of a pinion 22 and a conical crown wheel 23.

Figure 2:
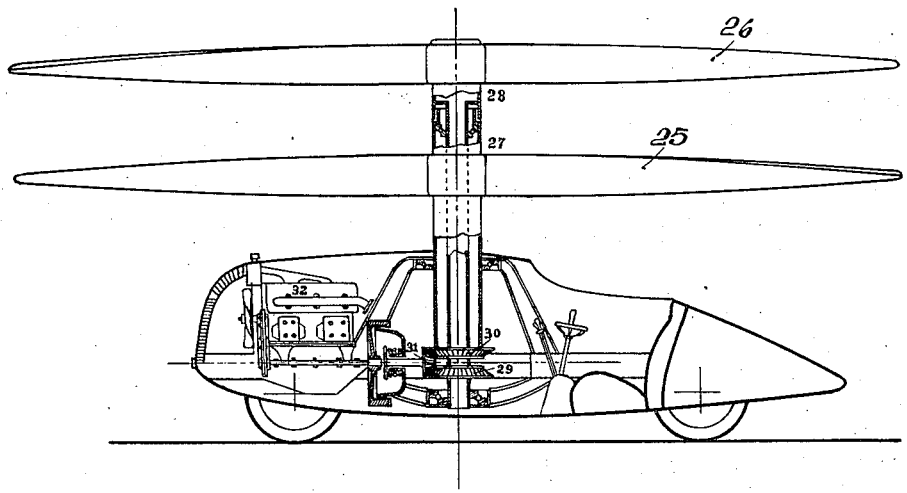
Fig. 2 is a similar view showing another form of the invention.

In Fig. 2, the propellers 25—26, have their respective hubs 27—28 operated by conical crown wheels 29—30 cooperating with a pinion 31, which latter may be the motor pinion. In this arrangement, the crown wheels 29—30 form a differential with the satellite 31, and any difference between the resistance of the propellers determines the rotation of the satellite around the same axis of both hubs. As the pinion 31 operated by the motor 32, has its axis supported by the general frame work of the apparatus, as by means of ball bearings, the whole apparatus participates in this movement of rotation.

In Fig. 3, the same differential advantage is obtained in that class of machines, whose propellers are disposed in horizontal alignment. The motor is coupled to the propellers 33—34 by means of a system of crown wheels and pinions 35—36, transmission shafts 38, 39, and cooperating double gears 40—41 for the propeller 33 and 42—43 for the propeller 34. In this system, any difference in the resistance to rotation of the propellers tends to a rotation of the whole apparatus around itself, under which condition, the whole system of pinions works as a differential.

In Fig. 4, there is shown a construction which allows the distribution at variable velocity of the whole power of the motor. This construction consists in the use of a differential composed of the satellites 50—51, whose axles are supported by a socket 53 directly keyed on the motor shaft 52. The conical crown wheels 54—55 are connected respectively with pinions 56—57, which in turn cooperate with gears 58—59, rigidly fixed to the concentric supports 60—61, to which the hubs of the propellers are secured. The housing 62 which supports the longitudinal struts 63, 64, 65, and 66, of the machine, maintains a proper rotative movement of the concentric supports by means of various axial or radial ball bearings, such as indicated at 67, 68, 69, 70, 71, 72, 73, and 74.

Braking members 75—76 act on the propeller hub supports 60—61 and are governed through the steering wheel 77, the rotation of which is transformed by the screw 78 through the cable 79 to reversely effect braking action. Thus if one propeller is braked, the differential including the satellites 50—51 and the crown gears 54—55 will act to accellerate the movement of rotation of the other propeller.

Claims:

1. A helicopter, having two oppositely rotating propellers, shafts for the respective propellers, one shaft being arranged within the other, a housing for the lower ends of the shafts, a rotatable connection between the inner shaft and the housing, bearings between the shafts adapted to prevent relative axial movement thereof, said housing having a cylindrical extension concentric with and enclosing the shafts, a bearing between said extension and the outer shaft, annular gear racks connected to the respective shafts, and a differential drive mounted in the housing beyond said annular racks and having pinions meshing with the respective racks for driving the propellers.

2. A helicopter, having two oppositely rotating propellers, shafts for the respective propellers, one shaft being arranged within the other, thrust bearings between the shafts for preventing relative axial movement thereof, annular gear racks secured to the respective shafts, said racks having opposed toothed faces in spaced relation, co-axial shafts extending between said racks, pinions on each shaft meshing respectively with each rack, a differential gear on each co-axial shaft, and satellite gears meshing with the differential gears and driven by a power shaft.

In testimony whereof he affixes his signature in presence of two witnesses.

RAUL PATERAS PESCARA.

Witnesses:
T. BOULAY,
ANGEL BELAIR.